Oct. 23, 1962    H. J. HOFF ET AL    3,059,491
SAW CHAIN DRIVE SPROCKET
Filed Aug. 11, 1958    2 Sheets-Sheet 1

INVENTORS.
HARRY J. HOFF
AND
STEPHEN J. HOFF
BY
*Schley, Frask & Jenkins*
ATTORNEYS.

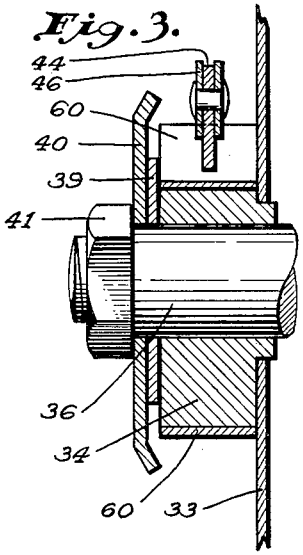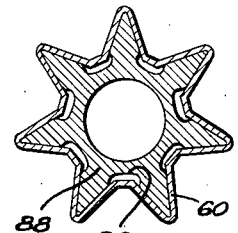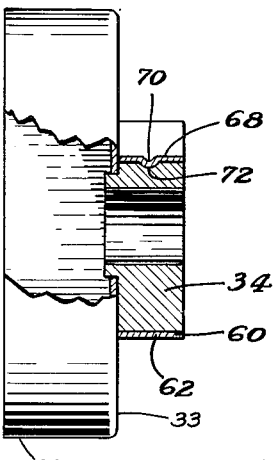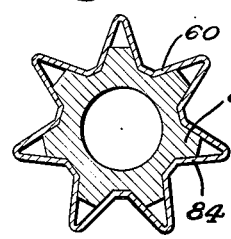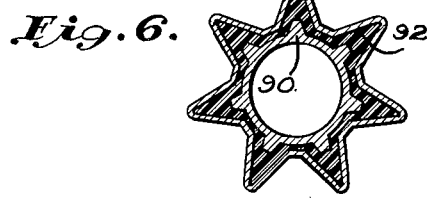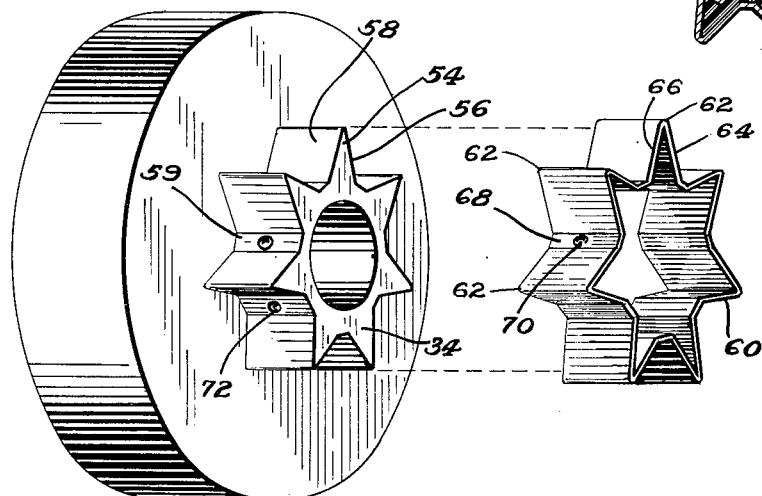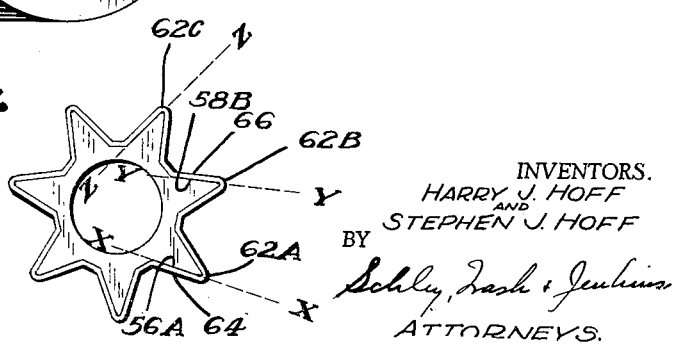

United States Patent Office 3,059,491
Patented Oct. 23, 1962

3,059,491
SAW CHAIN DRIVE SPROCKET
Harry J. Hoff and Stephen J. Hoff, Richmond, Ind., assignors to Hoffco, Inc., Richmond, Ind., a corporation of Indiana
Filed Aug. 11, 1958, Ser. No. 754,467
2 Claims. (Cl. 74—243)

This invention relates to chain drive sprockets for chain saws and to similar gears and gear-like elements.

The chain of a chain saw is supported and driven from a motor by a sprocket in the general form of a spur gear. Such sprockets are desirably of relatively small diameter and have relatively few teeth. This is especially so in direct-drive saws, where the drive sprocket is driven at motor speed directly from the motor shaft rather than through a speed-reducing gearing, where the small diameter and number of teeth permit a high motor speed and a slower chain speed. Moreover, chains must be narrow to minimize the width of the saw kerf. In consequence, high unit pressures occur between the chain and the sprocket, which causes rapid wear, especially on the sprocket. When a clutch such as a centrifugal clutch is used between the motor and sprocket, as is highly desirable if not substantially essential, it is common and advantageous to combine the sprocket as an integral part with the driven element of the clutch, usually the clutch drum; and in such case replacement of a worn sprocket requires replacement of relatively expensive sprocket and clutch member unit. Frequently, when a chain is replaced, the operator leaves a partially worn sprocket in place instead of replacing the sprocket unit, and this results in damage and excessive wear to the expensive chain from the imperfect sprocket.

It is the object of this invention to provide means to renew the wearing surface of a chain saw drive sprocket in a simple and inexpensive manner, and avoid the necessity for frequently replacing the clutch driven element, and thereby to reduce wear and damage to the chain, to improve the life and operation of chain saws. It is a particular object of the invention to provide a readily replaceable sleeve forming the outer surfaces of the sprocket.

In accordance with the invention, the chain-supporting and -driving surfaces of the sprocket or of similar gearlike element are formed on a shaped sprocket sleeve of substantially uniform wall thickness, desirably made from sheet metal or the like, and most desirably from a short section of tubing. The shaped gear- or sprocket-sleeve is mounted on a supporting hub or core. Such core is provided with shaped peripheral surfaces to snugly receive and support the sleeve. Such supporting surfaces may comprise only selected areas such as drive transmitting areas of the core and sleeve, but preferably the sleeve and core snugly interfit over substantially entire peripheral areas. The interfitting surfaces are desirably axially-straight surfaces, and the sleeve is desirably mounted and removed by axial sliding movement on the core. The hub or core forms the body of the resulting sprocket or gear and the shaped sleeve forms the bearing and drive surfaces. The sprocket core may be a relatively permanent element, and may be integral with a clutch driven element or otherwise included in the drive train. The sleeve is desirably a readily replaceable element.

The invention is especially useful for spur-gear like elements, and for convenience is described in terms of such elements, where the drive surfaces are external. But the invention may also be used for internal gear-like elements, and we do not mean to exclude them.

In a preferred embodiment of the invention, the sprocket core is of the usual form of a saw-chain drive sprocket, with the teeth uniformly undersized on all surfaces by an amount equal to the uniform thickness of the sleeve. The sleeve is shaped to closely fit against the undersized tooth surfaces of the sprocket core, and the sleeve thickness is such that when the sleeve is then placed on the sprocket core, the resulting assembly provides sprocket and tooth surfaces of the desired configuration and size. The core may be made of relatively tough material, and its surface provided with hardness and wear characteristics to withstand the relatively low unit pressures which will exist between the sleeve and core. The hardness and wear characteristics of the sleeve may be selected independently of the requirements of the core, and the sleeve may be made of a hardness and wear resistance to withstand the relatively high unit pressures of the chain on the sprocket, and these characteristics may be interrelated to the hardness and wear characteristics of the chain elements so that the inexpensive replaceable sprocket sleeve will take the major portion of the wear and will thus protect both the sprocket core and the chain from excessive wear.

The sprocket sleeve will encircle the core and will resist radial displacement for this reason. But it will also be secured by an interlocking action of the tooth shapes of the two parts. The sprocket sleeve has a cross-sectional configuration corresponding to the toothed outer peripheral configuration of the sprocket. In a chain sprocket, the teeth are commonly wedge shaped, with flat faces and narrow rounded tops. On each tooth, the two faces converge outward. In a 7-tooth sprocket as shown in FIGS. 1–6, however, the arrangement is such that the opposite outer faces of each pair of teeth diverge, rather than converge, outward. Because of this, each pair of teeth on the sprocket sleeve will grip and lock itself onto the pair of core teeth on which it is received. In sprocket or gear assemblies of larger numbers of teeth or differently shaped teeth this radial locking action may not occur on each pair of teeth, for a greater number of teeth in a group may be necessary to provide the outward divergence of end faces of the group of teeth. But the radial locking action will usually occur in groups of not more than a few—say three or four—teeth. Such locking action will serve to hold a sleeve in place on the sprocket core, and indeed will hold parts of a sleeve in place in the event the sleeve is fractured. This radial locking action cooperates to make the new sprocket construction practical, and to permit the sleeve to be made of relatively thin sheet metal, even for sprockets of relatively large diameter. Accordingly, the sleeve may preferably have a wall thickness of the order of from .030 to .060 inch. Chain drive sprockets ranging from 6 to 15 teeth and from ⅜ to 1 inch pitch may be made satisfactorily with sleeves of such wall thickness.

The sprocket sleeve may be held in place axially on the core in any desired manner, as by securing it between shoulders or washers at the ends of the sprocket core. Preferably, however, the sleeve may be made to lockingly engage the core. For example, one of the parts may be provided with a short projection and the other with a shallow socket into which the projection snaps when the parts are assembled. Preferably, one or more of the root portions of the sleeve is provided with an inwardly deformed dimple or projection, and corresponding sockets are formed at the bottoms of one or more, or preferably all, of the tooth spaces of the core, with the sockets shaped to receive the dimple or projection on the sleeve. Such interlocking means may require a specific orientation of the sleeve on the core, but the parts are desirably so symmetrical that no particular orientation is required.

The sleeve is preferably made from a short section of tubing. Tubing used may be either partially or wholly formed to the desired sleeve shape, but we have found it convenient to use tubing of circular cross section. Either seamless or welded tubing may be used, and we prefer welded tubing for the uniformity of its wall thickness, and have found no serious handicap from the presence of the longitudinal weld. The tubing or other blank is shaped in a forming die to a configuration providing the desired sprocket surfaces. This is conveniently done in a radially operating die, in which all the tooth shapes are formed simultaneously, and sufficient pressure and precision is used to coin the piece to accurate shape. After shaping, the gear or sprocket sleeve is desirably heat treated to produce desired hardness and wear resistance. It may also receive surface finishing treatment, such as grinding, on either its external or internal surfaces or both, but such treatments are not commonly necessary on an accurately shaped and hardened sleeve for saw chain sprocket use.

As a modification, the core may include a resilient portion, and may, for example, be made with a metallic hub with an elastomer or synthetic resin molded about to it to form the core body, and this may be provided with a metallic surface to provide a seat for the sprocket sleeve.

The accompanying drawings illustrate the invention. In such drawings:

FIG. 3 is a fragmental section on the line 3—3 of FIG. 1 showing the form of the chain and its relationship to the sprocket;

FIG. 4 is an exploded isometric view of a sprocket and sleeve assembly embodying the invention;

FIG. 5 is a fragmental axial section of the assembly shown in FIG. 4;

FIG. 6 is a radial section of a modified construction;

FIG. 7 is an end-elevation of a seven-tooth sprocket like that of FIGS. 1 to 5; and FIGS. 8 and 9 are radial sections of modifications in which the sprocket core supports the sprocket sleeve over less than its entire inner surface.

Figure 1:
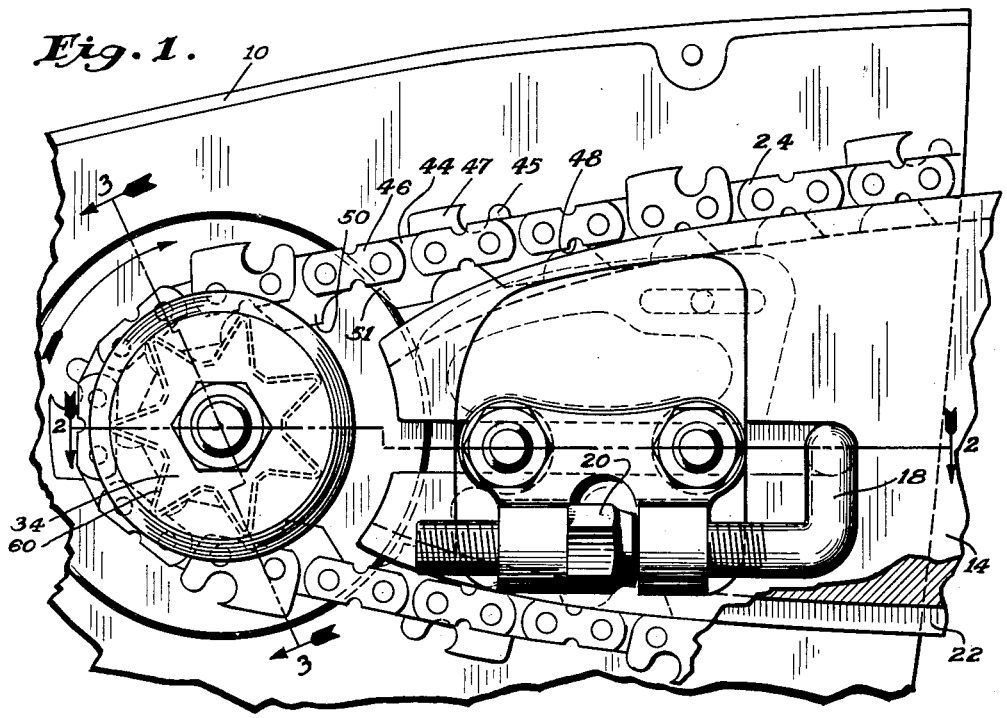
FIG. 1 is an end elevation of a chain drive mechanism embodying the invention.

The chain saw shown in the drawings has a frame 10 and a drive shaft 12 which, in a direct-drive saw, would normally be the crank shaft of the motor. A saw-supporting blade 14 is mounted on the frame 10 by means of mounting bolts 16, and is longitudinally adjustable by means of an adjusting bolt 18 and nut 20 reacting against a bracket held by the bolts 16. The edge of the saw blade 14 is provided with a groove 22 and a saw chain 24 is stretched around such blade and about the drive sprocket described below. The shaft 12 carries the driving element 25 of a centrifugal clutch, which includes a hub 26 fixed on the shaft, a pair of side plates 28 carried by such hub, and a pair of centrifugal clutch shoes 30 carried between the plates 28 and biased to retracted position. The driven member of the centrifugal clutch comprises a drum 32 surrounding the shoes 30 and carried by a sprocket hub or core 34 rotatably mounted on a reduced extension 36 of the shaft 12. Conveniently, the hub 34 and drum 32 assembly is freely rotatable on the shaft extension 36 and is held thereon between an inner washer 38 and an outer washer 39. A chain guide washer 40 of larger diameter than the sprocket is positioned against the washer 39 and is held in place on the shaft 36 by a nut 41.

Various designs of saw chains are in common use, and our invention is useful with any of such chains. The saw shown in the drawings is representative, and is used to illustrate the drive relation. The chain shown comprises a series of drive links 44 interconnected by pairs of side links or plates 46. In every second pair of such side plates 46, one of the side plates carries a cutter tooth 47 and a depth guide 45, and the successive cutter teeth are arranged alternatively on opposite sides of the chain. The side plates 46 are provided at their inner edges with notches 48 in which the teeth of the drive sprocket engage, to support the chain on such sprocket and to assist in transmitting drive from the sprocket to the chain. Each drive link 44 carries an inward extending drive tongue 50 whose trailing edge 51 is formed for driving engagement by the front face of a tooth of the drive sprocket. The drive tongues 50 of the chain ride in the groove 22 of the saw-supporting blade 14, and the chain side plates 46 ride on the wall edges of the blade groove 22, to guide and support the chain in its movement about the blade. It will be noted that the chain is relatively narrow and that the driving force is transmitted to it from but a few sprocket teeth acting on the relatively narrow edges of a few chain tongues 50. Similarly, the chain is supported on the sprocket by the narrow notched edges of only a few side plates 46. Accordingly, relatively high unit pressures occur, and wear is relatively rapid.

The sprocket shown in FIGS. 1 to 5 comprises a core part 34 in the general form of a spur gear, with seven teeth 54, each of wedge shape with both its front face 56 and its rear face 58 having a flat planar configuration. The entire outer or peripheral surfaces of the sprocket core 34 are composed of axially straight elements, so that all such surfaces are straight in the direction parallel with the axis of the sprocket.

Figure 2:
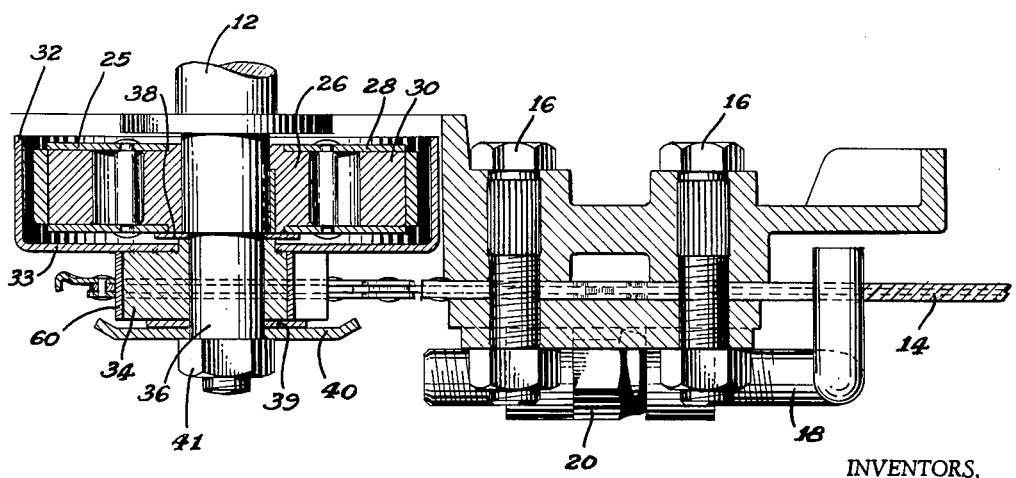
FIG. 2 is a section substantially on the line 2—2 of FIG. 1.

The sprocket core 34 carries and supports a sprocket sleeve 60, which is slidably mounted over it. The sleeve 60 is formed of sheet material, conveniently from a short section of thin-walled tubing. This is shaped, as in a radial die forming operation, to a cross-sectional configuration conforming to the cross-sectional outline of the desired sprocket, so that its outer surfaces provide the desired surface form of the sprocket. The sleeve 60 shown has a toothed configuration providing seven teeth 62, each having walls 64 and 66 to lie against the sprocket walls 56 and 58 respectively. The sleeve 60 is of such size and shape that its inner surfaces substantially fit the outer surfaces of the sprocket core 34, preferably with a snug fit or press fit. Because of the snug fit, and since there are normally no forces tending to displace the sleeve 60 from the core 34 in an axial direction, the sleeve tends to stay in place, once it is fitted on the core. To retain it, however, we may provide interengaging means between the sleeve and core to resist axial displacement. As shown in FIGS. 4 and 5, the root section 68 between one or more pairs of teeth 62 is provided with an inwardly pressed dimple 70, and a corresponding number, or preferably all, of the bottoms 59 of the tooth spaces on the core 34 are provided with depressions 72 to receive such dimples 70. In use as shown in FIG. 2, the sleeve 60 lies between the radial wall 33 of the clutch drum 32 and the sprocket retaining washer 39, and is thus securely retained on the sprocket core.

The sprocket sleeve is held against radial displacement from the core both by its encircling action and by interlocking with the supporting teeth. This interlocking action is shown in FIG. 7, where two adjacent sleeve teeth 62a and 62b are designated for reference. It will be noted that the front tooth wall 64 of the tooth 62a engages its underlying sprocket tooth face 56a in plane x—x, and that the rear wall 66 of the rearwardly adjacent tooth 62b engages its underlying sprocket tooth face 58b in a plane y—y. The planes x—x and y—y diverge in a direction outward from the center of the sprocket. Because of this divergence, the M-shaped portion of the sleeve 60 made up by the two teeth 62a and 62b locks itself on the sprocket by gripping engagement of the core teeth walls 56a and 58b, and thus retains itself against radial displacement from its underlying core part. Such an interlocking between the sleeve and the core occurs with each group of teeth on the sleeve and core. This interlocking action is even more pronounced if a group of three teeth 62a, 62b, and 62c is considered instead of only the two teeth 62a and 62b. The interface plane between the next rearwardly adjacent tooth 62c and its sprocket tooth is the plane marked z—z. A substantially greater divergence exists between the planes z—z and x—x, and the locking action is just that much more pronounced. In larger sprockets, with different numbers of differently shaped teeth, the number of teeth required in a group to produce this interlocking action may be greater than the two, but it is believed that an interlocking action will always occur between groups of a small number of teeth on the sleeve and core.

In the sprocket shown in FIGS. 1 to 5, the outer surface of the core 34 is substantially fully complementary with the inner surface of the sleeve over substantially the entire peripheral area of the core. But it is permissible for some gaps to occur, or to be provided in selected areas, especially for light-duty sprockets, while still retaining at least much of the advantage of the sprocket construction shown. FIGS. 8 and 9 illustrate this possibility. In FIG. 8, the core part 80 is formed in the form of a splined shaft with truncated teeth 82 which interfit the tooth walls 84 of the sleeve only adjacent the roots of the teeth and do not extend all the way to the points on the sleeve teeth. In FIG. 9, the bottoms 86 of the tooth spaces on the core 88 are deeper than the sleeve surfaces, and while the outer ends of the teeth snugly fit the sleeve there are gaps at the roots of the teeth.

FIG. 6 shows a further modification, in which a sleeve 60 is supported on a core composed of a central hub 90 and a toothed annular section 92 molded about the hub 90 and composed of an elastomeric resinous material such as rubber, nylon, or like materials.

In the new sprocket construction, the sprocket core 34 may be a permanent part of the power train, and normally will never need replacement during the life of the saw. The sleeve 60, on the other hand, is readily replaceable. It fits snugly over the core 34 and provides the driving and wearing surfaces on the sprocket. In the structure shown, the points of the sleeve teeth 62 engage in the notches 48 of the side plates of the chain and support the chain, and the front walls or faces 64 of the sleeve teeth drivingly engage the chain tongues 51 to drive the chain. The relatively small number of teeth on the sprocket engage and drive a relatively larger number of elements of the chain, and the parts which receive the greatest wear are on the sprocket. Such wear is taken by the replaceable sleeve 60, which can be replaced at regular intervals depending on the extent and severity of use. Chains do wear and break, for other reasons, and are replaced; and whenever a chain replacement is made, the sprocket sleeve may be replaced at the same time, to provide a renewed sprocket for the new chain.

The replaceable sleeve is a relatively inexpensive part, and can readily be replaced in the power train with a minimum amount of disassembly. For replacing a sprocket in the chain saw of FIGS. 1 and 2 (without changing the chain) it is only necessary to remove the nut 41 and the two washers 39 and 40, pull off the sleeve 60 from the sprocket core 34 and from beneath the chain, and insert a new sleeve 60 on the sprocket core 34, beneath the chain. While it is obviously helpful to loosen a tight chain, it is not necessary to remove the chain, nor to remove the sprocket core and clutch drum assembly from the shaft 36. By this simple replacement of a sleeve 60, a new surface is provided on the drive sprocket.

We claim as our invention:

1. In combination with a chain saw having a drive shaft and a saw chain carried by a supporting blade in a saw plane normal to the axis of said shaft, said chain including a series of links and having inwardly presented support faces for supporting engagement with the tooth crests of its drive sprocket and having inward extending tongues for driving engagement by the tooth drive faces of the sprocket, a driving clutch element driven by said shaft, a chain drive unit comprising a sprocket-shaped hub rotatably mounted on said shaft axis and having a plurality of undersize sprocket teeth thereon extending through said saw plane, each tooth being wedge-shaped with flat front and rear faces converging to an apex, a driven clutch element fixed on said hub in clutching relation with said driving clutch element and forming a flange at one end of said teeth, a sleeve of substantially uniform thickness slidably fitting over said teeth and having substantially flat front and rear tooth walls conforming to the front and rear walls of the undersize hub teeth and being bent substantially back upon itself at the apex of each such hub tooth to form narrow rounded tooth crests joining said front and rear walls, said saw chain being engaged about said drive unit in supported and driven relation with the sprocket crests and drive faces formed by said sleeve, and a retaining flange removably secured to the hub at the opposite end of said sleeve from said clutch element flange, said retaining flange being removable from the drive unit independently of the mounting thereof on the shaft axis, and said sleeve being axially removable and replaceable on the hub without removing the drive unit or demounting the chain from surrounding relation with the drive unit.

2. A drive unit for a saw chain composed of a series of links and having inwardly presented support faces by which the chain is supported on the tooth crests of its drive sprocket and having inwardly extending tongues positioned for driving engagement by the tooth drive faces of the sprocket, said drive unit comprising a central core part adapted to be mounted on a shaft and having a plurality of undersize sprocket teeth thereon, said sprocket teeth being substantially of wedge shape defined by substantially flat and axially straight front and rear faces positioned to converge at a sharp apex, a sleeve part slidably fitting over said core part, said sleeve part comprising a wall of substantially uniform thickness, formed to provide tooth configurations with front and rear tooth walls conforming to the front and rear faces of said wedge-shaped sprocket teeth, the sleeve wall being bent substantially back upon itself at the apex portions of the tooth configurations to form narrow arounded bent portions joining said front and rear tooth walls, whereby said sleeve provides a sprocket-shaped outer surface forming wedge-shaped teeth with narrow rounded crests for supporting the chain and with flat tooth walls flanking said crests for driving a saw chain engaged about the drive unit, a clutch element permanently fixed to said core part and forming a flange at one end thereof, said sleeve being received on said core part in abutting relation with said flange, and a retaining flange removably secured to the core part in retaining relation with the opposite end of the sleeve, said retaining flange being removable from the core part independently of the mounting of the core part on its shaft, to permit axial removal and replacement of the sleeve on the core part without disturbing the mounted relation of the core part and clutch element on a shaft.

References Cited in the file of this patent

UNITED STATES PATENTS

| | | |
|---|---|---|
| 820,789 | Hutchins | May 15, 1906 |
| 985,905 | Johnston | Mar. 7, 1911 |
| 988,106 | Johnston | Mar. 28, 1911 |
| 1,004,980 | Broadfield | Oct. 3, 1911 |
| 1,393,886 | Doty | Oct. 18, 1921 |
| 2,575,582 | Chamberlain | Nov. 20, 1951 |
| 2,673,471 | Kline et al. | Mar. 30, 1954 |
| 2,799,174 | Pelletier | July 16, 1957 |

FOREIGN PATENTS

| | | |
|---|---|---|
| 231,366 | Great Britain | Apr. 2, 1925 |